United States Patent [19]
Yang et al.

[11] Patent Number: 5,918,199
[45] Date of Patent: Jun. 29, 1999

[54] ABSOLUTE POSITION DETECTION METHOD FOR STROKE SENSING CYLINDER

[75] Inventors: Soon Yong Yang, Changwon; Man Hyung Lee; Min Cheol Lee, both of Kumjung-ku, all of Rep. of Korea

[73] Assignee: Volvo Construction Equipment Korea Co., Ltd., Rep. of Korea

[21] Appl. No.: 08/998,986

[22] Filed: Dec. 29, 1997

[30] Foreign Application Priority Data

| Oct. 31, 1997 | [KR] | Rep. of Korea | 97-57073 |
| Oct. 31, 1997 | [KR] | Rep. of Korea | 97-57074 |
| Oct. 31, 1997 | [KR] | Rep. of Korea | 97-57075 |

[51] Int. Cl.[6] ................................................. G01B 7/00
[52] U.S. Cl. .......................... 702/150; 702/158; 702/166; 364/182; 364/474.35
[58] Field of Search ..................................... 702/150, 158, 702/166; 324/207.12, 207.23, 207.24, 239, 207.22; 364/182, 474.35

[56] References Cited

U.S. PATENT DOCUMENTS

| 4,951,048 | 8/1990 | Ichikawa et al. | 324/207.24 |
| 5,299,143 | 3/1994 | Hellinga et al. | 702/158 |
| 5,461,311 | 10/1995 | Nakazato et al. | 702/166 |
| 5,497,083 | 3/1996 | Nakazato et al. | 324/207.24 |

*Primary Examiner*—John Barlow
*Assistant Examiner*—Hien Vo
*Attorney, Agent, or Firm*—Harness, Dickey & Pierce, P.L.C.

[57] ABSTRACT

An improved absolute position detection method is provided for a stroke sensing cylinder which includes a magnetic scale detecting step for obtaining a plurality of sine wave form voltages having different phases using a magnetic sensor unit in accordance with a driving operation of the cylinder. A wave form generation step is also provided for converting the sine wave form voltage obtained in the magnetic scale detection step into a square wave form and generating a triangle wave form having the same period as the thusly converted square wave form. A first absolute position value detection and stroke direction judging step is then provided for judging a first absolute position value and stroke direction of the cylinder using a pair of square and triangle wave forms generated in the wave form generation step. Lastly, a second absolute position value computation and storing step is provided for computing and storing a second absolute position value having a predetermined value based on the first absolute position value. The method of the present invention is directed to detecting a magnetic flux change of a magnetic scale using a plurality of magnetic sensors. The magnetic scale is disposed along the cylinder rod and includes at least one different magnetic scale processing period contained within a regularly protruded and recessed portion. Signal-processing is achieved using a microprocessor and a 1/N-dividing counter. The thusly signal-processed wave forms are counted and an absolute position and stroke direction is determined.

13 Claims, 16 Drawing Sheets

☐ :ABSOLUTE POSITION POINT WHEN MOVING IN THE NORMAL DIRECTION
○ :ABSOLUTE POSITION POINT WHEN MOVING IN THE REVERSE DIRECTION

□ :ABSOLUTE POSITION POINT WHEN MOVING IN THE NORMAL DIRECTION

○ :ABSOLUTE POSITION POINT WHEN MOVING IN THE REVERSE DIRECTION

ABSOLUTE POSITION DETECTION METHOD FOR STROKE SENSING CYLINDER

BACKGROUND OF THE INVENTION

1. Field of the Invention

The present invention relates to an absolute position detection method for a stroke sensing cylinder, and more particularly, to an improved absolute position detection method for a stroke sensing cylinder which is capable of detecting a direction and absolute position by sensing a stroke of a hydraulic and/or pneumatic cylinder (hereinafter called "cylinder"), which is used for automation of construction equipment, such as an excavator and wheel loader.

2. Description of the Conventional Art

Generally, in construction equipment (apparatus), such as an excavator, a cylinder is installed for driving a working apparatus, such as a boom, arm, bucket, etc. As operational oil is supplied to the cylinder and is discharged to a storing tank, the cylinder performs a stroke operation, thereby operating the working apparatus.

In the above-described construction equipment, as electric-hydraulic servo techniques have advanced, there is an increasing need for the apparatus to perform various operations independent of the skill of the operator.

Therefore, in order to automate the construction equipment, it is necessary to detect information concerning the position of the working apparatus. This information is needed for a control system, namely, for determining the relative position of the boom, arm and bucket as well as the absolute position thereof.

In order to detect information related to the position of the working apparatus, a position detection circuit is used for detecting the stroke of the cylinder, as shown in FIGS. 1 and 2.

FIG. 1 illustrates a schematic view of a conventional hydraulic and pneumatic cylinder which includes a cylinder rod having a magnetic scale.

As shown therein, the conventional hydraulic and pneumatic cylinder includes a piston 120 installed within a cylinder 110. The piston 120 may reciprocate in the up and down direction and the leftward and rightward direction. A rod 130, which supports the movement of the piston 120, is integrally formed with the piston 120 at one side thereof.

In addition, a magnetic scale 140 is formed at one side of the rod 130. The magnetic scale 140 has a protruded and recessed shape formed between the top dead point and the bottom dead point of the piston 120. A magnetic sensor 150, which is spaced-apart from the portion where the magnetic scale 140 is formed, is provided in the rod 130 for detecting a magnetic flux, wherein the magnetic flux varies based on the protruded and recessed portions. The magnetic sensor 150 produces a signal indicative of the magnetic flux. The magnetic sensor unit 150 is composed of a pair of sensors (sensor A and sensor B), such as a hall effect sensor, etc.

The cylinder rod 130 is made of steel (Fe), and the portion where the magnetic scale 140 is formed is coated with Cr. When the magnetic flux generated by the magnetic sensor 151 passes through the protruded and recessed portions, the output signal from the magnetic sensor unit 150 varies. Actually, the output signals have a sine wave form.

Furthermore, the distance between a pair of magnetic sensors is longer than one period of the magnetic scale 140.

In the thusly constituted conventional cylinder 110, as the piston 120 reciprocates between the top dead point and the bottom dead point of the cylinder 110, the rod 130, which is integrally engaged with the piston 120, is moved, and the moving state of the magnetic scale 140 formed on the rod 130 is detected by the magnetic sensor unit 150, thus recognizing the stroke position of the cylinder 110.

When the piston 120 is stopped, the magnetic scale 140 is detected by the magnetic sensor 151. The stroke variation of the cylinder 110 is then measured by computing the moving distance of the piston 120 based on the scale of the magnetic scale 140.

FIG. 2 is a block diagram illustrating a position detection circuit for a hydraulic and/or pneumatic cylinder using a 1/N dividing counter and a microprocessor.

As shown therein, the cylinder driving unit 210 is driven in accordance with a cylinder driving signal. The cylinder driving unit 210 in turn drives the cylinder 220 in which a magnetic scale is formed. The magnetic sensor unit 230 engaged with the cylinder 220 detects a magnetic variation of the magnetic scale and applies an output signal to a first microprocessor 240.

The microprocessor 240 communicates with a memory apparatus 150 and a 1/N divider counter 260, so that it controls the entire operations of the position detection switch with respect to the stroke of the cylinder, including a signal processing.

The operation of the position detection circuit for detection of the stroke of the cylinder will be explained with reference to the accompanying drawings.

The cylinder driving unit 210 drives the cylinder 220 in accordance with a cylinder driving signal inputted by an operator. A pair of magnetic sensors 231, such as a hall effect sensor, is installed in the magnetic sensor unit 230. The pair of magnetic sensors 231 detect the magnetic flux variation with respect to the magnetic scale (refer to reference numeral 140 of FIG. 1) formed in the rod of the cylinder 220, and the thusly detected signals are applied to the signal processing unit 232.

The signal processing unit 232 amplifies and filters the detection signals (sine wave forms) from the magnetic sensors 231. In other words, the signal processing unit 232 converts the detection signals into signals which are capable of being recognized by the microprocessor 240 and then the thusly converted signals are outputted to the microprocessor 240.

The microprocessor 240 converts the analog signals from the signal processing unit 232 into digital signals using the analog/digital converter. The microprocessor 240 further converts the sine wave form signals into square wave form signals using a predetermined algorithm.

The 1/N divider counter 260 receives the square wave form signals from the microprocessor 240 and divides it by 1/N and outputs the thusly divided signals to the microprocessor 240. The microprocessor 240 computes the stroke of the cylinder using the divided signals.

The detected pulse signal is divided to increase the accuracy of the detection by N-times. The value N is determined depending on the desired accuracy. The first microprocessor 240 counts the number of pulses, which is N-times the number of magnetic scales formed on the cylinder rod 130. The first microprocessor then computes the variation of the cylinder, and stores the thusly computed variation into the memory apparatus 250.

The values stored in the memory apparatus are displayed on a predetermined display unit.

The moving direction of the cylinder is determined by comparing a pair of square wave form phases. If the phase of the magnetic sensor B of the magnetic sensor unit 230 is ahead of the other phases, the cylinder rod shown in FIG. 1 moved in the direction of decompression (hereinafter called "normal direction"). If the phase of the magnetic sensor A is ahead of the other phases, the cylinder rod is moved in the direction of compression (hereinafter called "reverse direction").

FIG. 3 illustrates wave form diagrams of a signal processing 1/N counter when detecting a magnetic variation, based on the circuit of FIG. 2. When the cylinder is moved in the reverse direction, four pulses are generated depending on the following equation 1 (which will be described later), When the cylinder is moved in the normal direction, four pulses are generated depending on the equation 2 (which will be described later).

In Equations 1 and 2, A and B denote square waves converted from the sine waves detected by the magnetic sensors A and B of the magnetic sensor unit 230. /A and /B denote the inverted signals of A and B, and )A and )B denote wave forms generated by one shot circuit having the ¼-dividing counter. Lastly, )/A and )/B denote the inverted signals of )A and )B.

$$(Ax)B)+(/Bx)A)+(Bx) /A)+(/Ax) /B) \qquad \text{Equation 1}$$

$$(Ax) /B)+(/Bx) /A)+(Bx)A)+(/Ax)B) \qquad \text{Equation 2}$$

In the above-described conventional position detection apparatus for a cylinder stroke, since the pulses are detected by the magnetic scales formed in the protruded and recessed shape, only the relative position is detected. In addition, it is impossible to detect the absolute position from the magnetic variation of the initial position of the cylinder rod during the operation.

Additionally, the conventional position detection apparatus requires two magnet sensors to be used, wherein the sensors have a phase difference of 90°. In this case, it is difficult to accurately position the sensors to have a phase difference of 90° due to the assembling error.

Furthermore, the output sine wave form of the sensor may not maintain a consistent wave form due to external variables, such as vibrations, or impacts. Therefore, it is difficult to have a phase difference of 90° with respect to the wave forms.

Therefore, there may occur a variation error. When such variation errors are accumulated, the accuracy of the detection of the relative position is decreased, and more seriously the direction of the stroke of the cylinder may be changed.

SUMMARY OF THE INVENTION

Accordingly, it is an object of the present invention to provide an absolute position detection method for a stroke sensing cylinder which overcomes the aforementioned problems encountered in the conventional art.

It is another object of the present invention to provide an absolute position detection method for a stroke sensing cylinder that is capable of detecting an absolute position and stroke direction using a predetermined algorithm.

To achieve the above objects, there is provided an improved absolute position detection method for a stroke sensing cylinder which includes a magnetic scale detecting step for obtaining a plurality of sine wave form voltages having different phases using a magnetic sensor unit in accordance with a driving operation of the cylinder. A wave form generation step is also provided for converting the sine wave form voltage obtained in the magnetic scale detection step into a square wave form and generating a triangle wave form having the same period as the thusly converted square wave form. A first absolute position value detection and stroke direction judging step is then provided for judging a first absolute position value and stroke direction of the cylinder using a pair of square and triangle wave forms generated in the wave form generation step. Lastly, a second absolute position value computation and storing step is provided for computing and storing a second absolute position value having a predetermined value based on the first absolute position value. The method of the present invention is directed to detecting a magnetic flux change of a magnetic scale using a plurality of magnetic sensors. The magnetic scale is disposed along the cylinder rod and includes at least one different magnetic scale processing period contained within a regularly protruded and recessed portion. Signal-processing is achieved using a microprocessor and a 1/N-dividing counter. The thusly signal-processed wave forms is counted and an absolute position and stroke direction is determined.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The absolute position detection method for a stroke sensing cylinder according to the present invention will now be explained with references to FIGS. 4 through 20.

First, FIGS. 4 through 6 illustrate detailed protruded and recessed portions formed in a cylinder rod processed to be adapted to be used for the embodiments of the absolute position detection method for a stroke sensing cylinder according to the present invention.

Figure 4A:
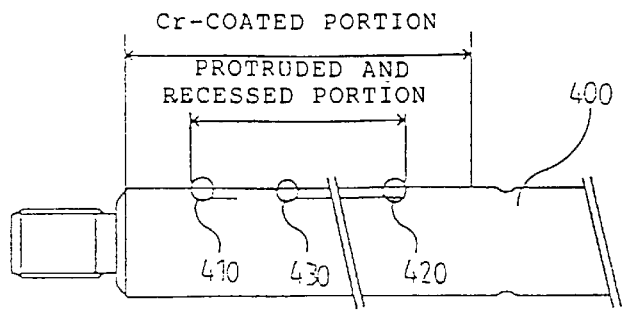
FIGS. 4A and 4B are views illustrating a protruded and recessed portion formed in a cylinder rod to be used for an absolute position detection method for a stroke sensing cylinder according to the present invention.
Figure 4B:
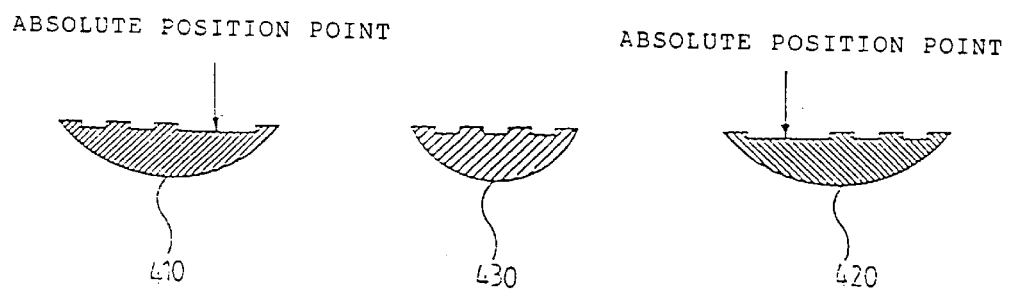

As shown in FIGS. 4A and 4B, the protruded and recessed portions formed in the cylinder rod processed to be used for the embodiments of the present invention are configured to have magnetic scales each having (410 and 420) different scale formation periods. The magnetic scales (410 and 420) include portions positioned a predetermined distance from both ends of the protruded and recessed portions of a cylinder rod 400. The cylinder rod 400 includes a magnetic scale (430) which is formed having a predetermined pitch within a Cr-coated portion.

Figure 5A:
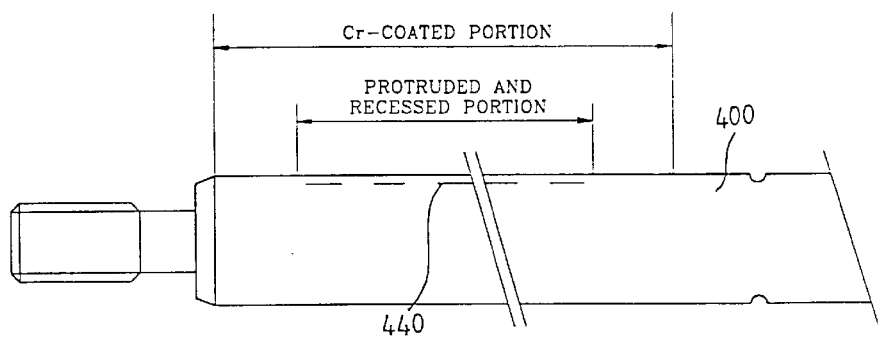
FIGS. 5A and 5B are detailed views illustrating a protruded and recessed portion formed in a cylinder rod to be used for an absolute position detection method for a stroke sensing cylinder according to another embodiment of the present invention.
Figure 5B:
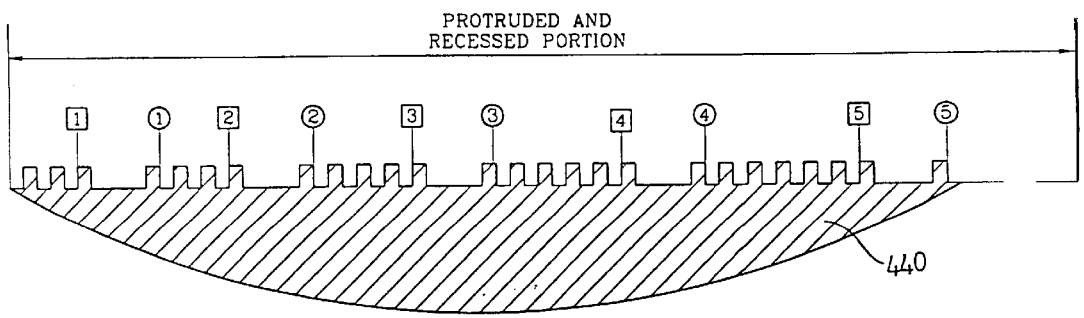

As shown in FIGS. 5A and 5B, the protruded and recessed portion is formed in the cylinder rod according to another embodiment of the present invention. The protruded and recessed portion is formed by protrudely processing the Cr-coated portion of the cylinder rod 400, thus forming a magnetic scale. The protruded and recessed portion (440) includes a recessed portion in which the magnetic scales are formed at a predetermined formation period. A predetermined position value is given to the thusly recessed portions, respectively.

Here, the protruded and recessed portion which are formed at a predetermined formation period is formed in such a manner that the n-number of protruded portions are formed from the end portion of the protruded and recessed portion, and then the one and half period of the magnetic scale is recessed, and the (n+1) number of protruded portions are formed, and then the one and half period portion of the magnetic scale is recessed.

For example, after two protruded portions are formed, the recessed portion having a length which is three times the distance of one protruded portion is formed. After the protruded portion is formed, the recessed portion having a length which is three times one protruded portion is formed.

Therefore, the numbers of the magnetic scales protrudely formed between two recessed portions having a length which is three times one protruded portion are different.

Figure 6A:
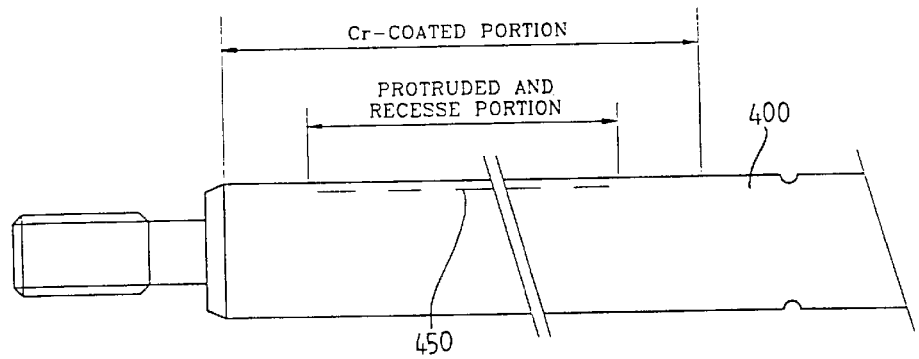
FIGS. 6A and 6B are detailed views illustrating a protruded and recessed portion formed in a cylinder rod to be used for an absolute position detection method for a stroke sensing cylinder according to still another embodiment of the present invention.
Figure 6B:
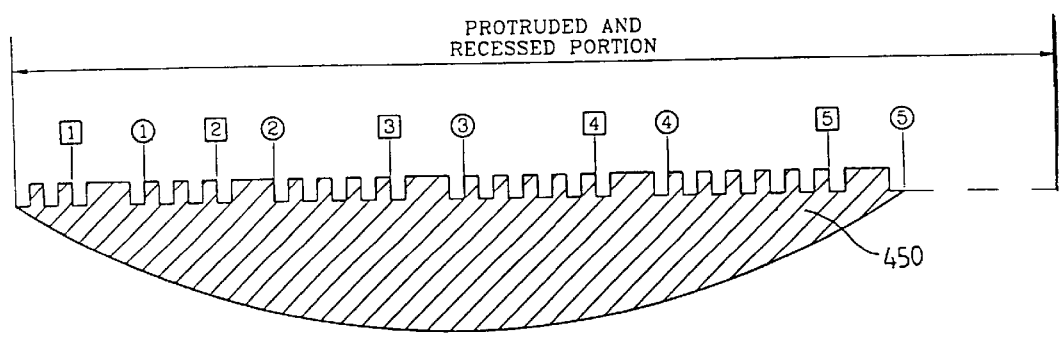

As shown in FIGS. 6A and 6B, the protruded and recessed portion is formed in the cylinder rod according to another embodiment of the present invention. The protruded and recessed portion is formed by protrudely and regularly forming a magnetic scale in the Cr-coated portion of the cylinder rod 400, and the protruded and recessed portion includes a protruded portion (450) which is formed at a predetermined deformed period.

Here, the protruded portion which is formed at a predetermined deformed period is formed by protrudely forming the magnetic scale for a one and half portion after the n-number of recessed portions are formed from one end of the magnetic scale.

For example, after two recessed portions are formed, one protruded portion having a length which is three times the portion of one recessed portion is formed, and after the protruded portion is formed, a protruded portion having a length which is three times one recessed portion is formed after three recessed portions are formed.

Therefore, the numbers of magnetic scales formed between two protruded portions having a length which is three times one recessed portion are all different.

Figure 1:
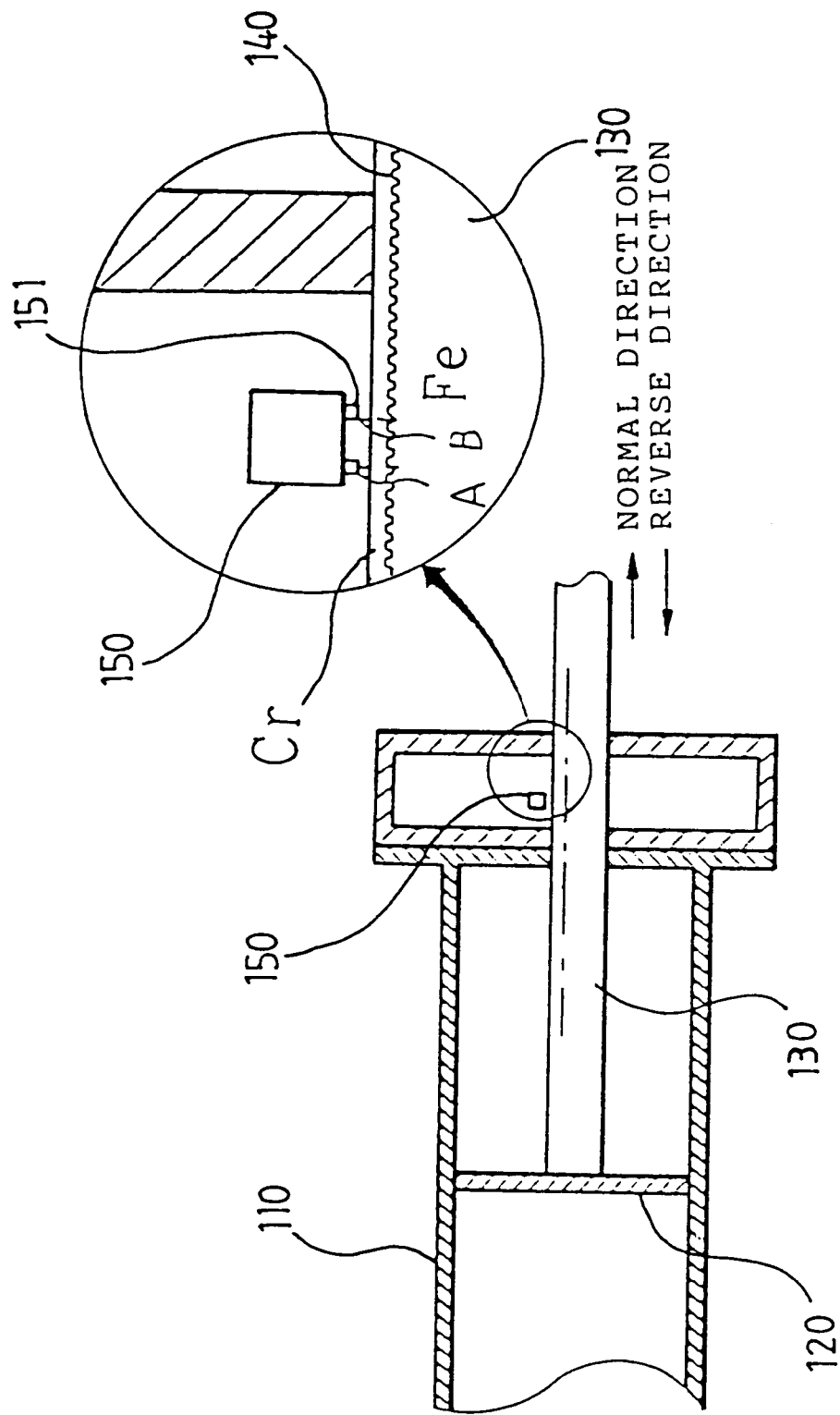
FIG. 1 is a schematic view illustrating a conventional hydraulic and/or pneumatic cylinder having a cylinder rod having a regularly formed magnetic scale.

As shown in FIGS. 4 through 6, the thusly constituted cylinder and magnetic sensor unit are the same as the conventional cylinder construction as shown in FIG. 1.

Figure 2:
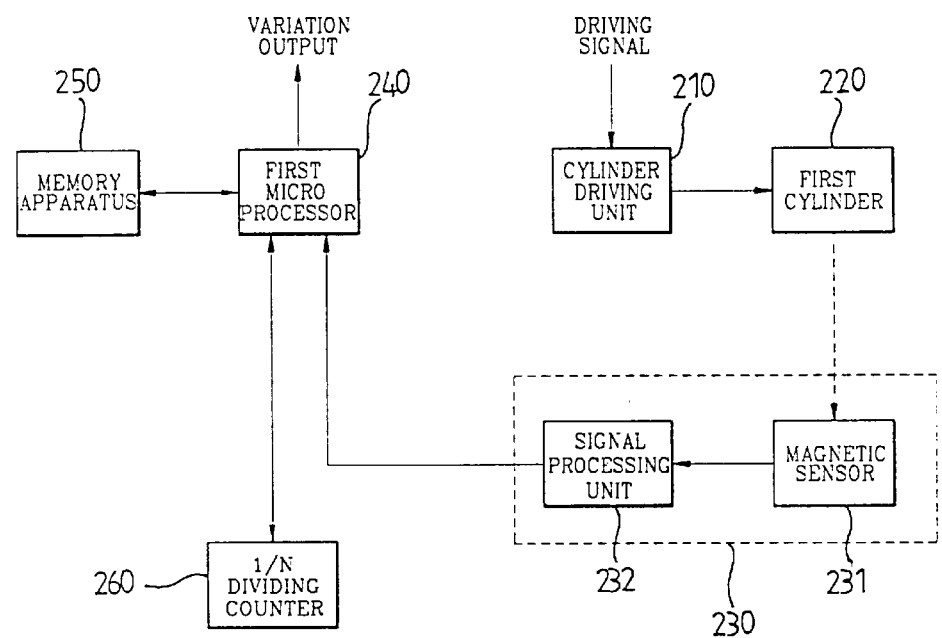
FIG. 2 is a block diagram illustrating a stroke position detection circuit of a conventional hydraulic and/or pneumatic cylinder.
Figure 7:
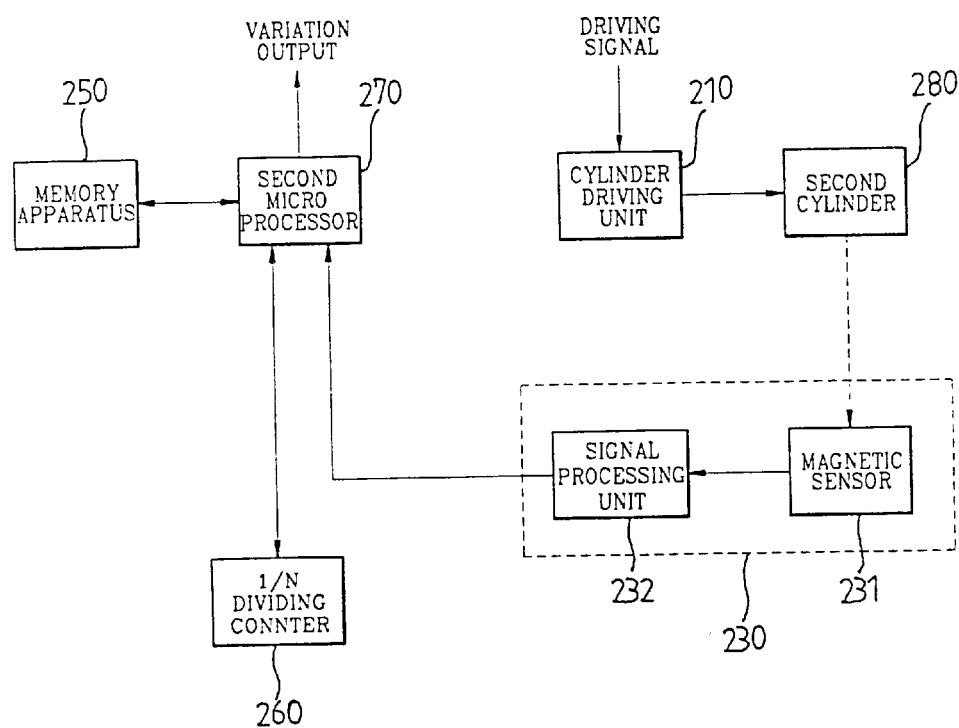
FIG. 7 is a block diagram illustrating an absolute stroke position detection circuit of a cylinder adapted to an absolute position detection method for a stroke sensing cylinder according to the present invention.

FIG. 7 is a block diagram illustrating an absolute stroke position detection circuit of a cylinder adapted to an absolute position detection method for a stroke sensing cylinder according to the present invention. As shown therein, the construction of the circuit is identical to the construction of the conventional circuit shown in FIG. 2, except the present invention further includes a different formation type of the magnetic scale, a different signal processing flow of the microcomputer and a different control method.

Namely, FIG. 7 illustrates a block diagram of an absolute stroke position detection circuit of a cylinder which is adapted to an absolute position detection method for a stroke sensing cylinder according to the present invention.

As shown therein, the cylinder driving unit 210 which is driven in accordance with a cylinder driving signal inputted thereto drives a second cylinder 280 having a cylinder rod in which a magnetic scale, as shown in FIGS. 4B, 5B and 6B, is formed. The magnetic sensor unit 230 disposed in the cylinder 280 detects the changes of the magnetic fluxes of the magnetic scale and outputs an output signal to the second microcomputer 270.

The second microcomputer 270 receives and communicates with the memory apparatus 250, which may be installed in the circuit or may be separately provided and further communicates with the 1/N-dividing counter 260. Such arrangement enables the entire operation of the absolute stroke position detection circuit of the cylinder to be controlled.

The operation of the absolute position detection circuit with respect to the stroke of the cylinder as shown in FIG. 7 will now be explained with reference to FIGS. 8 through 20.

Figure 8:
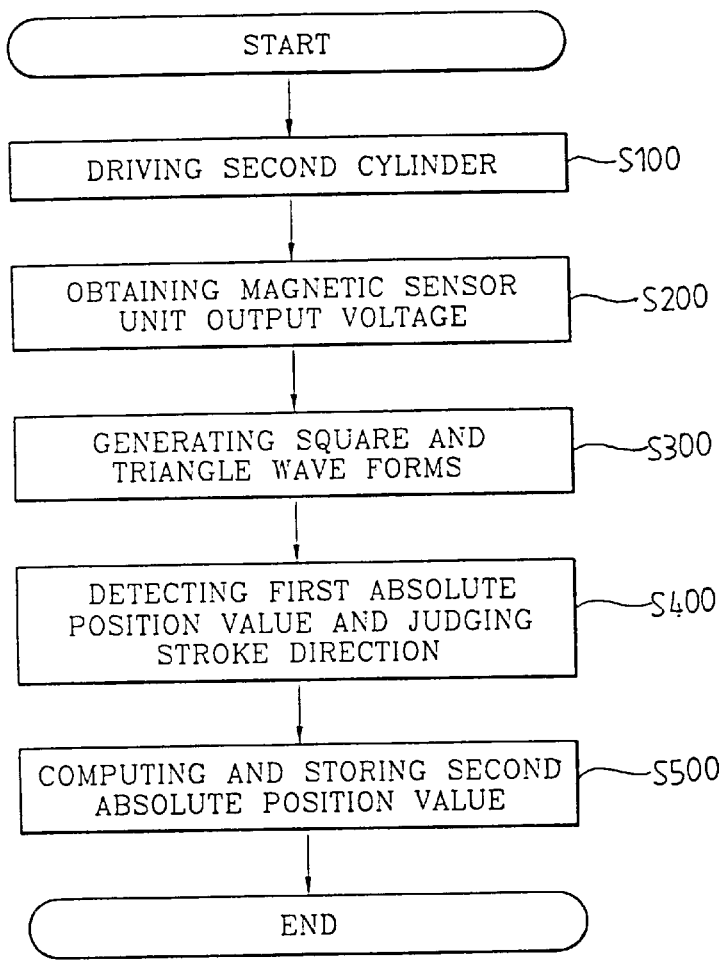
FIG. 8 is a flow chart illustrating an absolute position detection method for a stroke sensing cylinder according to the present invention.

FIG. 8 illustrates a flow of the absolute position detection method for a stroke sensing cylinder according to the present invention.

As shown therein, the method is illustrated for use with a cylinder rod having more than one magnetic scale formed thereon. The magnetic scale includes different predetermined formation period. The magnetic scales produce a magnetic flux that is detected using a plurality of magnetic sensors. A signal processing is implemented using the microprocessor and 1/N-dividing counter. The processed signal wave form is counted. Therefore, the absolute position and stroke direction of the cylinder are determined. In the thusly constituted method, there are provided the steps of a magnetic scale detection step (S200) for obtaining a plurality of different sine wave form voltages, which have a predetermined phase, from the magnetic sensor unit in accordance with the driving operation (S100) of the cylinder. A wave form generation step (S300) is then provided for generating a triangle wave form having the same period as the converted square wave form. A first absolute position value detection and stroke direction judging step (S400) is also provided for judging a first absolute position value and stroke moving direction of a cylinder using pairs of the square wave forms and triangle wave forms generated in the wave form generation step (S300). Lastly, a second absolute position value computation and storing step (S500) is provided for computing and storing a second absolute position value having a predetermined value based on the first absolute position value determined in the first absolute position value detection and stroke direction judgement.

Figure 9:
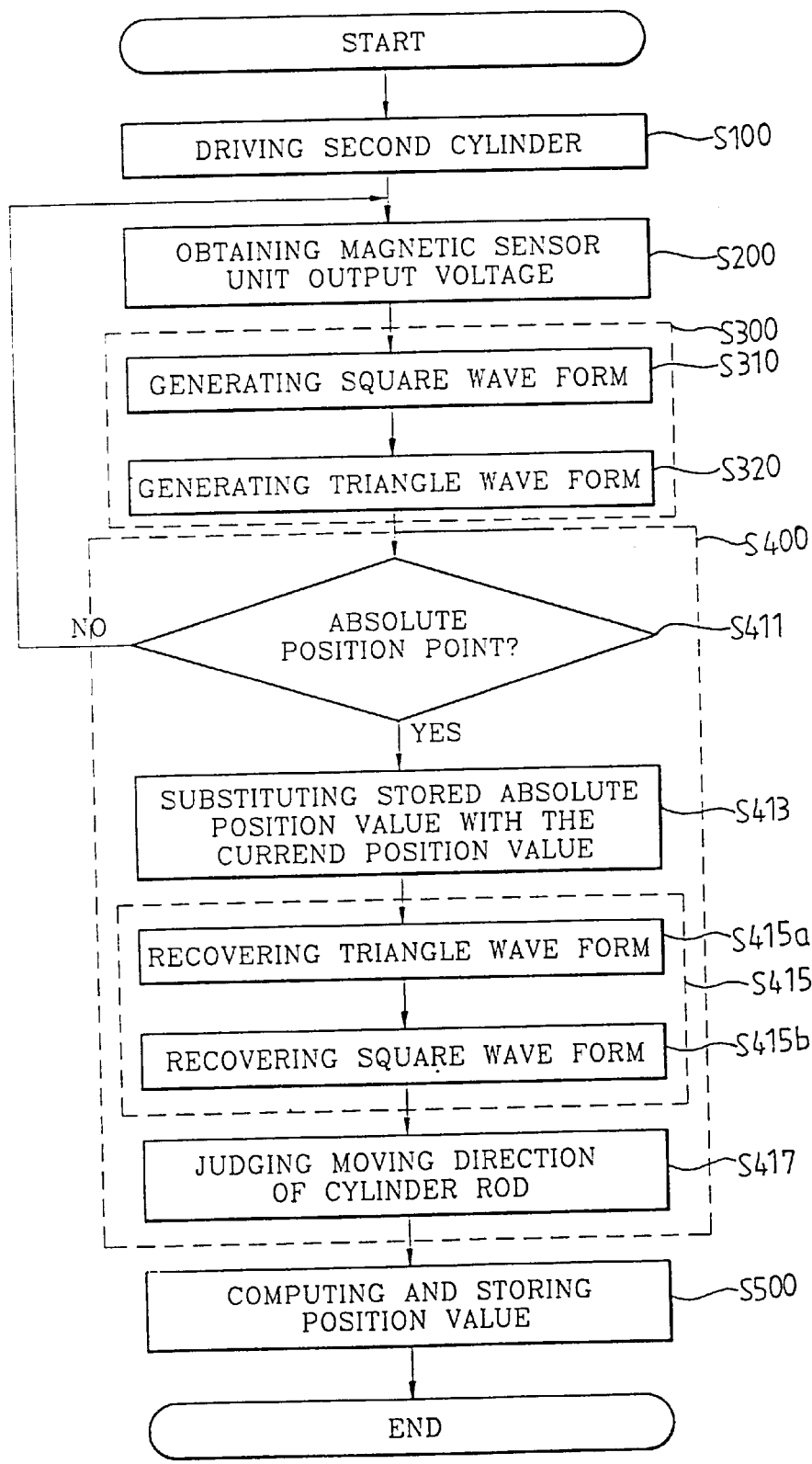
FIG. 9 is a flow chart illustrating an absolute position detection method for a stroke sensing cylinder according to the present invention when the cylinder of FIG. 4 is adapted.

FIG. 9 is a flow chart illustrating an absolute position detection method for a stroke sensing cylinder according to the present invention when the cylinder of FIG. 4 is used.

As shown therein, when using the cylinder shown in FIG. 4, the absolute position detection method for a stroke sensing cylinder according the present invention, comprises the steps of a magnetic scale detection step S200 for obtaining a plurality of sine wave form voltages having different phases from the magnetic sensor unit in accordance with the driving S100 of the cylinder. A wave form generation step S300 is then provided for converting the sine wave form voltages obtained in the magnetic scale detection step S200 into square wave forms (S310) and generating triangle wave forms (S320) having the same periods as the converted square wave forms. A first absolute position value detection and stroke direction judging step S400 is also provided for judging a first absolute position value and stroke moving direction of a cylinder using a pair of square and triangle wave forms generated in the wave form generation step S300. The first absolute position value detection and stroke direction judging step S400 includes a first step S411 for recognizing and judging an absolute position point by comparing the phases of a pair of triangle wave forms generated in the wave form generation step S300 and a second step S413 for changing the position value stored in the memory apparatus with a first absolute position value when there is an absolute position point as determined in the first step S411. A third step S415 is provided for recovering (S415a) the triangle wave form generated in the wave form generation step after the second step S413 to a normal wave form. The normal wave form has the same period as the period of the regularly protruded and recessed portion. The third step S415 is also provided for recovering the identical period square wave forms based on the recovered triangle wave forms. Lastly, a fourth step (S417) is provided for comparing the phases of the square wave forms recovered in the third step S415 and judging the direction with respect to the stroke of the cylinder. It should be noted that the above series of control steps are performed by the second microprocessor 270.

The absolute position detection method for a stroke sensing cylinder having the above-described control steps according to the present invention will be explained.

The cylinder driving unit 210 drives (S100) the second cylinder 280 in accordance with a cylinder driving signal by an operator. At this time, the magnetic sensors (sensor A and sensor B), which have different phases and are disposed in the magnetic sensor unit 230, detect the magnetic flux changes of the magnetic scales (shown in FIG. 4B) formed in the rod of the second cylinder 280. The output voltage is then applied to the signal processor 232.

The signal processing unit 232 converts the signals into signals that the second microprocessor 270 is capable of detecting and outputs the thusly converted signals to the second microprocessor 270. At this time, the second microprocessor 270 amplifies and filters the detection signal from the magnetic sensors 231 having the sine wave forms (S200).

The second microprocessor 270 converts the analog signal from the signal processing unit 232 into a digital signal using the analog/digital converter and converts the sine wave form signals into a pair of square wave forms using the pulse conversion algorithm (S310), and the thusly converted square wave forms are converted into the triangle wave forms having the identical period using the triangle wave form generation algorithm (S320).

Figure 10:
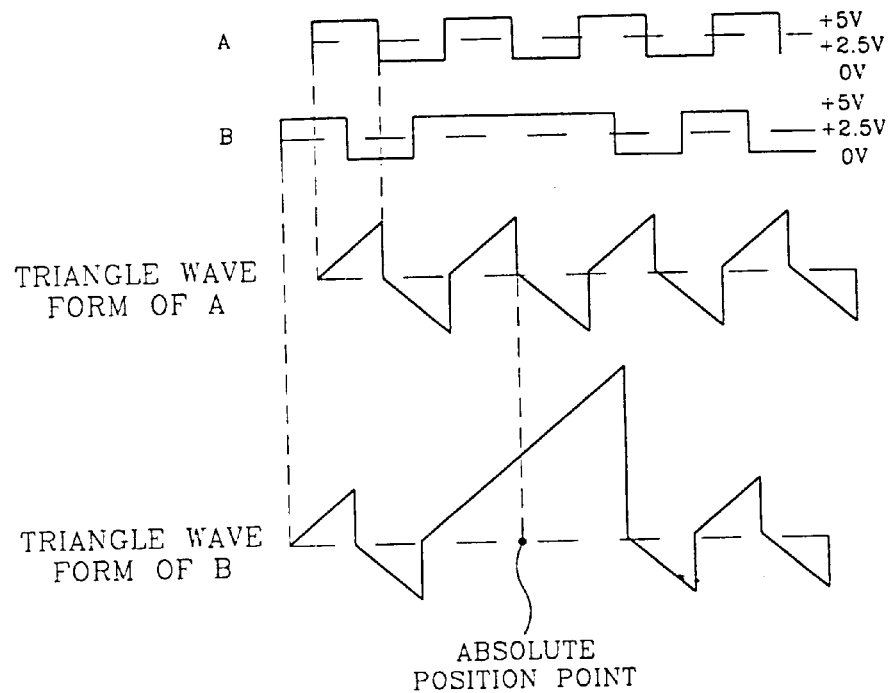
FIG. 10 is a wave form diagrams illustrating a square wave form and a triangle wave form converted when a cylinder is moved in the normal direction during the operation shown in FIG. 9.

FIG. 10 is wave form diagrams illustrating a square wave form and a triangle wave form converted when a cylinder is moved in the normal direction during the operation shown in FIG. 9. Here, the above-described triangle wave forms are generated by the following principle.

As shown therein, the pair of square wave forms have two values of +5 volts and 0 volts which are the driving voltage level of the second microprocessor 270. The pair of square wave forms further have 90° phase difference due to the arrangement of two magnetic sensors. In the portion where the magnetic scale having different periods, the period is extended by two times. In addition, since the distance between the magnetic sensors is no longer than the size of the magnetic scale by a few times, the two square wave forms become different in the portion where the magnetic scales having different periods.

In the triangle wave forms generated in accordance with the sine wave forms, the size thereof is fixed initially at 0, which is a predetermined reference electric potential. When the rising edge of the square wave form is detected, that is, when the square wave forms increase from 0 volts to +5 volts, the values of the triangle wave forms are accumulated. Such accumulation continues at every sampling time while the square wave forms maintain +5 volts. When the falling edge of the square wave forms is detected, that is, when the square wave forms decrease from +5 volts to 0 volts, the size of the triangle wave forms is fixed to 0. Such 0 value is maintained while the square wave forms maintain 0 volts, the values of the triangle wave forms are accumulated by a predetermined value at every sampling time.

At this time, the sampling time may be made shorter in accordance with the fineness of the absolute position value. In the embodiment of the present invention, the reference electric potential of the triangle formation is fixed to [+25] +2.5 volts.

Figure 11:
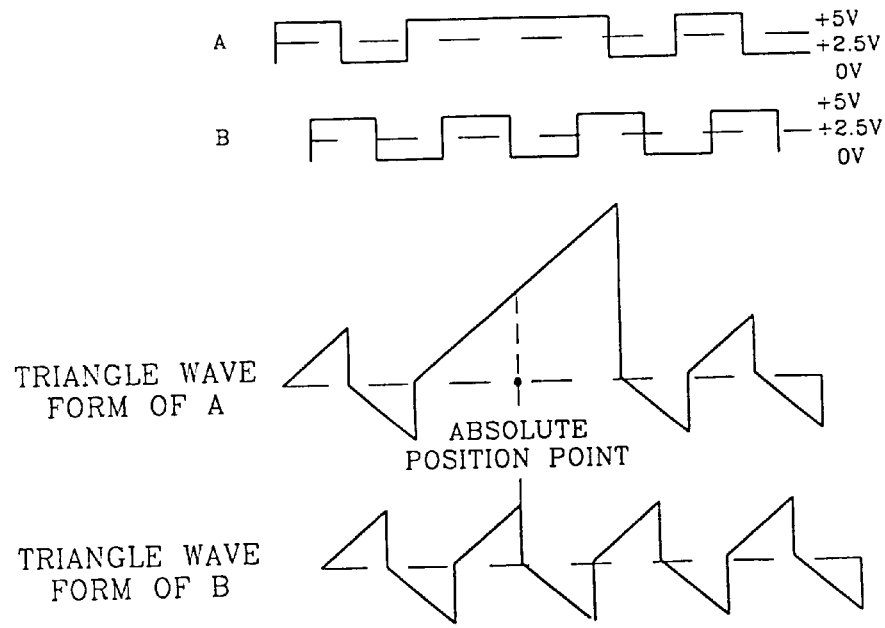
FIG. 11 is a wave form diagrams illustrating a square wave form and a triangle wave form converted when a cylinder is moved in the reverse direction during the operation shown in FIG. 9.

FIG. 11 is wave form diagrams illustrating a square wave form and a triangle wave form converted when a cylinder is moved in the reverse direction during the operation shown in FIG. 9. As shown therein, the wave forms are generated in the same manner as the principle explained in the embodiment of FIG. 10 except that the phase sequences of the two wave forms are changed.

Namely, the phase difference of the magnetic sensor 231 is 90°, such that when the cylinder is moved in the normal direction or the cylinder is moved in the reverse direction, one of the wave forms produced will be formed earlier than the other.

In addition, the triangle wave forms generated in the above-described principle are three times larger than the peak values of the triangle wave forms having the normal peak value, in the portion where the magnetic scales having different periods are provided.

After the triangle wave forms are generated by the second microprocessor 270 (S320), the absolute position point is determined using the thusly generated triangle wave forms. If one of the pairs of the peak values of the triangle wave forms exceeds a predetermined timed compared to the peak value of one period, and the peak value of another phase is 0, the point is recognized as an absolute position point (S411). The position values already stored in the memory apparatus 250 are then replaced with the first absolute position value with respect to the current position (S413).

As shown in FIGS. 4B, 10 and 11 of the present invention, the midpoint of the magnetic scale, which has a different periods compared to the other scales, is determined to be the absolute position point.

In the embodiment of the present invention using the cylinder as shown in FIG. 4A and AB, the absolute position point exists in two points. The first absolute position value corresponding to each absolute position point is stored in the memory apparatus 250.

Figure 12:
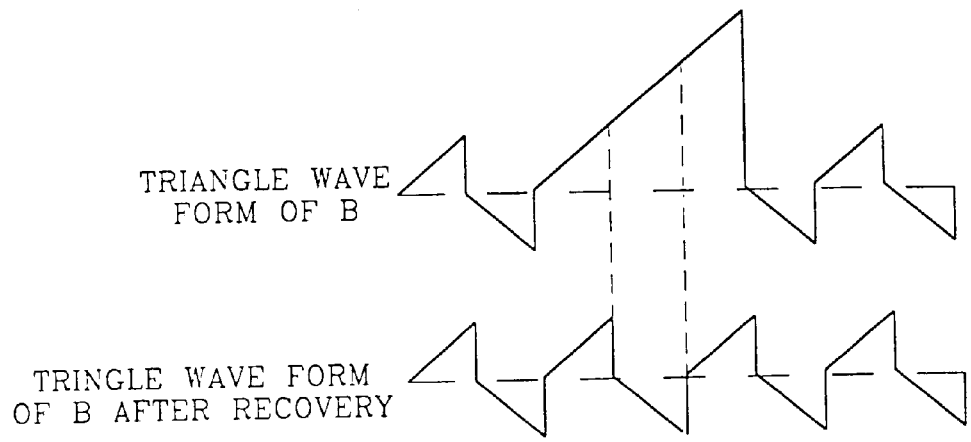
FIG. 12 is a wave form diagrams illustrating a recovery of a square wave form and triangle wave form during the operation shown in FIG. 9.

FIG. 12 is wave form diagrams illustrating a recovery of a square wave form and triangle wave form during the operation shown in FIG. 9.

In order to compute the second absolute position value, which is the variation of the final cylinder rod, the triangle wave form generated in the step S320 is recovered (S415$a$) to the triangle wave forms corresponding to the protruded and recessed portions of the regularly formed magnetic scale. The square wave form of the identical period is then recovered (S415$b$) based on the thusly recovered triangle wave forms. The thusly recovered wave forms are then inputted into the 1/N-dividing counter 260.

The triangle wave forms are recovered in such a manner that the peak values of the triangle wave forms are decreased from 0 in order to form triangle wave forms corresponding to the normal magnetic scales. For example, a time period from 1.1 times to 2 times is used from 2.1 times and 3 times, thus recovering the triangle wave forms.

The square wave forms are recovered from the thusly recovered triangle wave forms (S415$b$), and the phases of the thusly recovered square wave forms are compared to determine the moving direction of the cylinder rod (S417). As shown in FIG. 10, if the phase B is ahead of the other phases, it is determined that the direction is the normal direction. As shown in FIG. 11, if the phase A is ahead of the other phases, it is determined that the direction is the reverse direction.

After the moving direction of the cylinder is judged, the second absolute position value, which is the absolute amount the cylinder rod has moved, is computed (S500).

Figure 13:
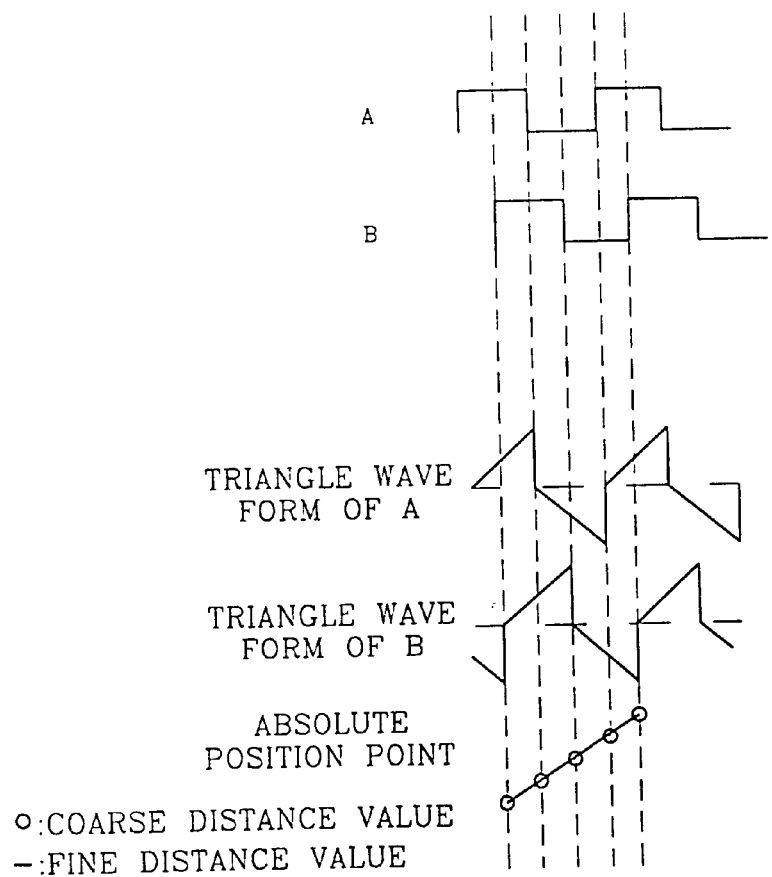
FIG. 13 is a wave form diagrams illustrating a method for computing a second absolute position value with respect to a stroke of a cylinder according to the present invention.

FIG. 13 is wave form diagrams illustrating a method for computing a second absolute position value with respect to a stroke of a cylinder according to the present invention.

As shown therein, the second absolute position value with respect to the stroke of the cylinder is computed. To this end, the coarse distance value is first computed by dividing by 1/N and counting the recovered square wave forms. The final distance value is then obtained by dividing the current triangle wave form value by the peak value of the triangle wave form by the previous period. These values are the summed. The above-described operation will be explained in more detail based on the ¼-dividing counter which is adapted to the embodiment of the present invention.

Figure 3:
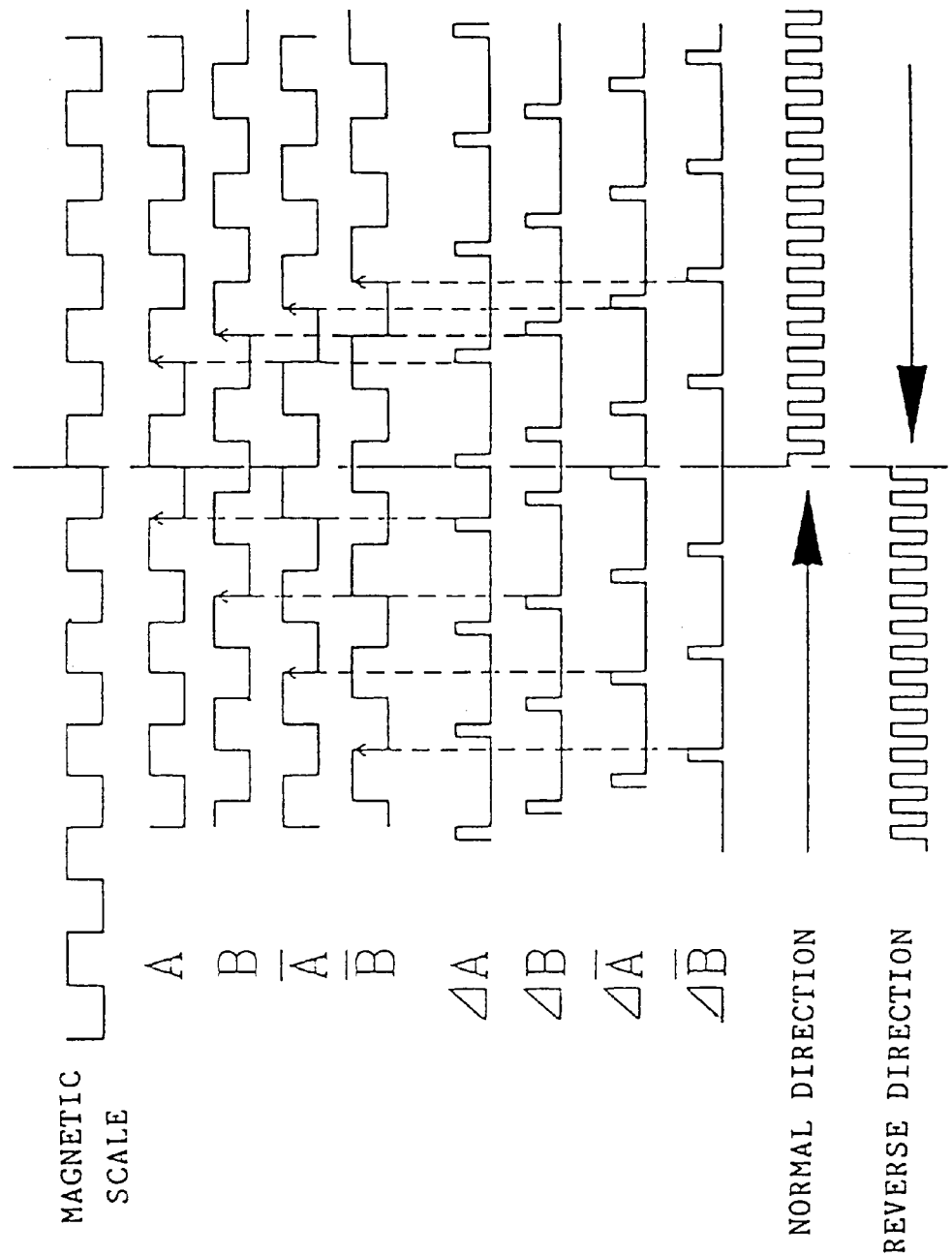
FIG. 3 is a wave form diagrams illustrating signals when ¼-dividing using a 1/N-dividing counter of FIG. 2.

The 1/N-dividing counter 260, as shown in FIG. 3, performs the algorithm shown in the Equations 1 and 2 and receives the recovered square forms from the second microprocessor 270 and divides the same by ¼.

At this time, the detected pulse signals are divided for increasing the accuracy of the detection by N-times. The N-value is determined depending on a desired accuracy.

The second microprocessor 270 counts the number of pulses of the ¼-divided square wave forms, computes the coarse distance value with respect to the cylinder stroke which is accurate by 4 times the magnetic scales, and stores the values into the memory apparatus 250.

After the coarse distance value is computed, the position value which is more accurate than the ¼-dividing method using the recovered triangle wave forms. At this time, the fine distance value is obtained by dividing the current triangle wave form values by the peak value of the triangle wave form by the previous period. The thusly obtained values are stored into the memory apparatus 250.

If the fine distance value is greater than the position value of the ¼ period, the value should be subtracted as much as the position value of the ¼ period for the reason that the position value of the ¼ period is computed by the 1/N-dividing counter 260.

For example, one period of the magnetic scale is 2 mm, the coarse distance value of 1.5 mm is computed using the ¼-dividing counter, and the fine distance computation is performed, which is more accurate than the coarse distance value using the fine distance counting algorithm.

At this time, if the fine distance value is greater that 0.5 mm, the value is subtracted by 0.5 mm because it is computed by the ¼-dividing counter.

As a result, the second absolute position value, which is the final position value, is obtained by summing the coarse distance value and fine distance value stored in the memory apparatus 250. This value is stored into the memory apparatus 250 as the current absolute position value of the cylinder rod with respect to the stroke of the cylinder. The value may be outputted to a predetermined display unit (not shown).

Figure 14:
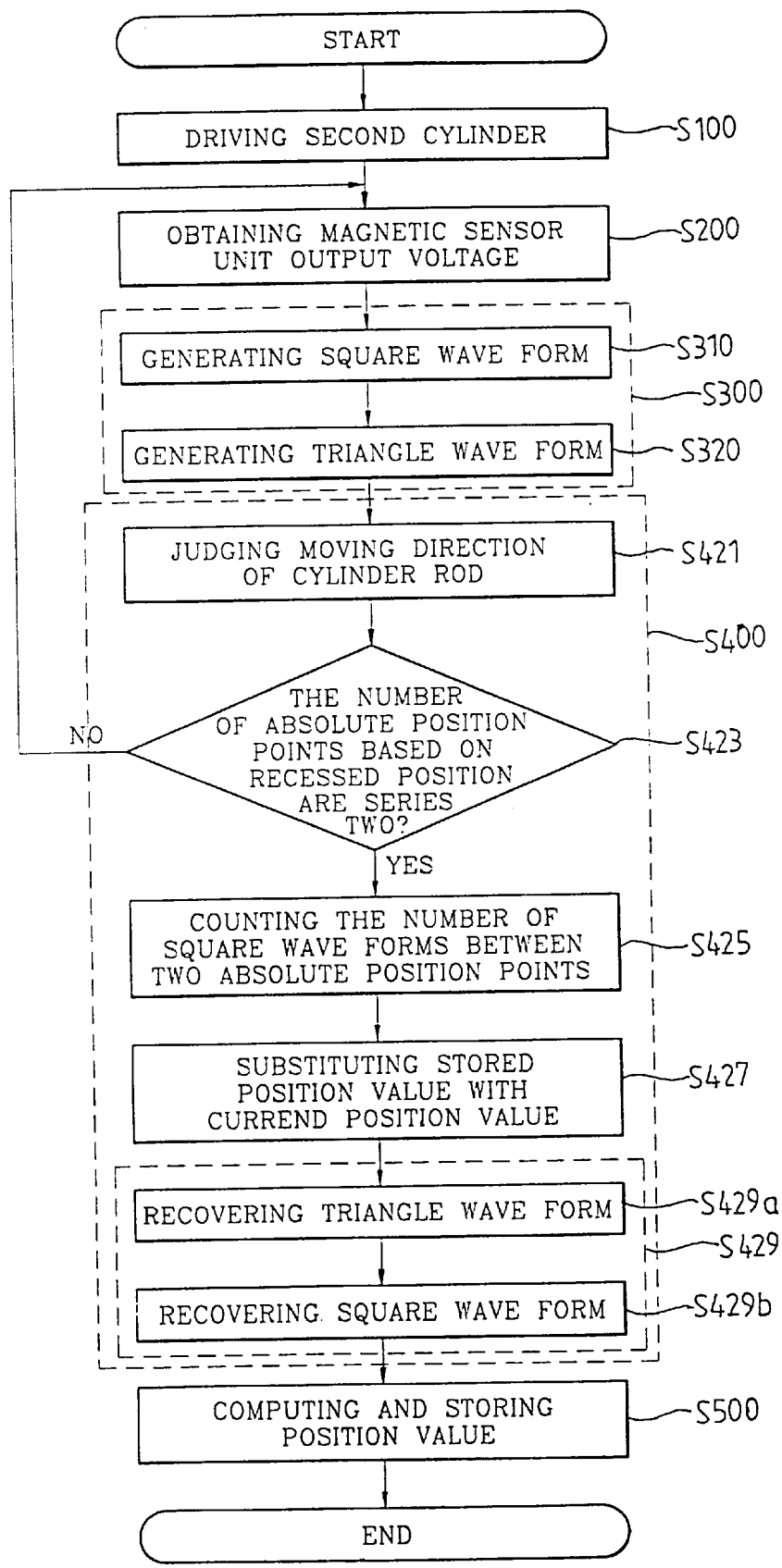
FIG. 14 is a flow chart illustrating an absolute position detection method for a stroke sensing cylinder according to the present invention when the cylinder shown in FIG. 5 is adapted.

FIG. 14 is a flow chart illustrating an absolute position detection method for a stroke sensing cylinder according to the present invention when the cylinder shown in FIG. 5 is adapted. As shown therein, the first absolute position value detection and stroke direction judging step S400 will now be explained by omitting the same construction as the above-described embodiment of the present invention.

In the cylinder rod having a recessed portion in which the magnetic scales are not formed at a predetermined interval in the regularly formed magnetic scales and a predetermined position value. The first absolute position value detection and stroke direction judging step S400 includes a first step S421 for comparing a pair of square wave form phases generated in the wave form generation step S300 and determining the stroke direction of the cylinder. A second step S423 is also provided for comparing a pair of triangle wave form phases generated in the wave form generation step S300 and determining whether the absolute position points based on the recessed portion based on the deformation period is series two. A third step S425 is then provided for counting the number of square wave forms between two absolute position points when the number of absolute position points are series two. A fourth step S427 is also provided for substituting the stored position value with the first absolute position value corresponding to the current position. The position value is stored in the memory apparatus as a value corresponding to the direction determined in step S421 and the number of square wave forms counted in the third step S425. Lastly, a fifth step S429 is provided for recovering the triangle wave forms generated by the wave form generation step S300 into the normal wave forms (S429a) and recovering the square wave forms having the identical period based on the thusly recovered triangle wave forms S429b).

The absolute position detection method for a stroke sensing cylinder having the above-described control steps according to the present invention will now be explained with reference to the accompanying drawings.

First, the cylinder driving unit 210 drives the second cylinder 280 (S100) in accordance with the cylinder driving signal by an operator. At this time, the magnetic sensors (sensor A and sensor B), which have different phases and are disposed in the magnetic sensor unit 230, detect the magnetic flux changes of the magnetic scales (reference numeral 440 in FIG. 5B) formed in the rod of the second cylinder 280. The output voltage is then applied to the signal processor 232.

The signal processing unit 232 converts the signals into signals that the second microprocessor 270 is capable of detecting and outputs the thusly converted signals to the second microprocessor 270. At this time, the second microprocessor 270 amplifies and filters the detection signal from the magnetic sensors 231 having the sine waveforms (S200).

The second microprocessor 270 converts the analog signal from the signal processing unit 232 into a digital signal using the analog/digital converter and converts the sine wave form signals into a pair of square wave forms using the pulse conversion algorithm (S310), and the thusly converted square wave forms are converted into the triangle wave forms having the identical period using the triangle wave form generation algorithm (S320).

Figure 15:
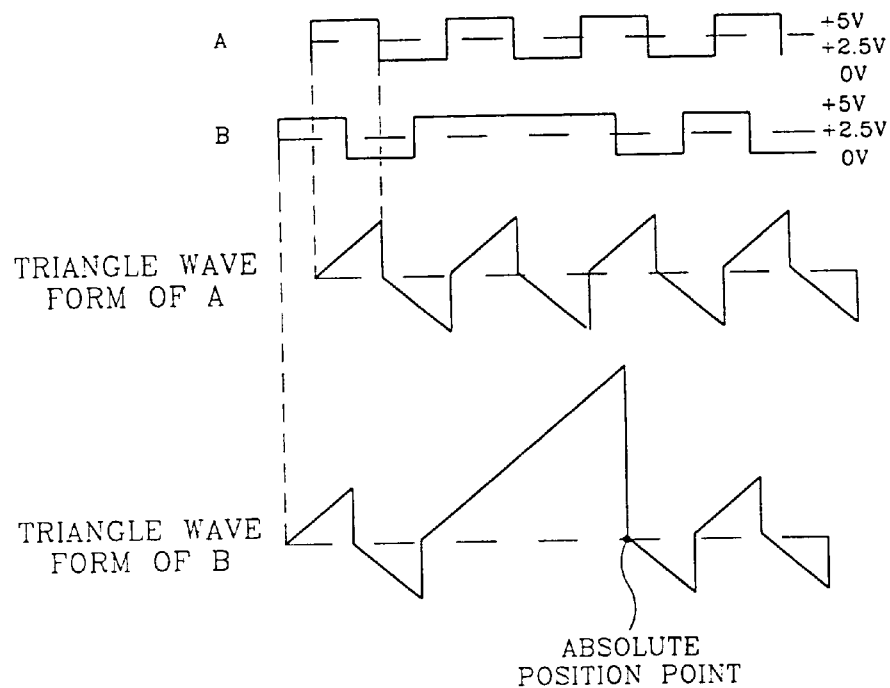
FIG. 15 is a wave form diagrams illustrating a square wave form and triangle wave form converted when a cylinder is moved in the normal direction during the operation shown in FIG. 14.
Figure 16:
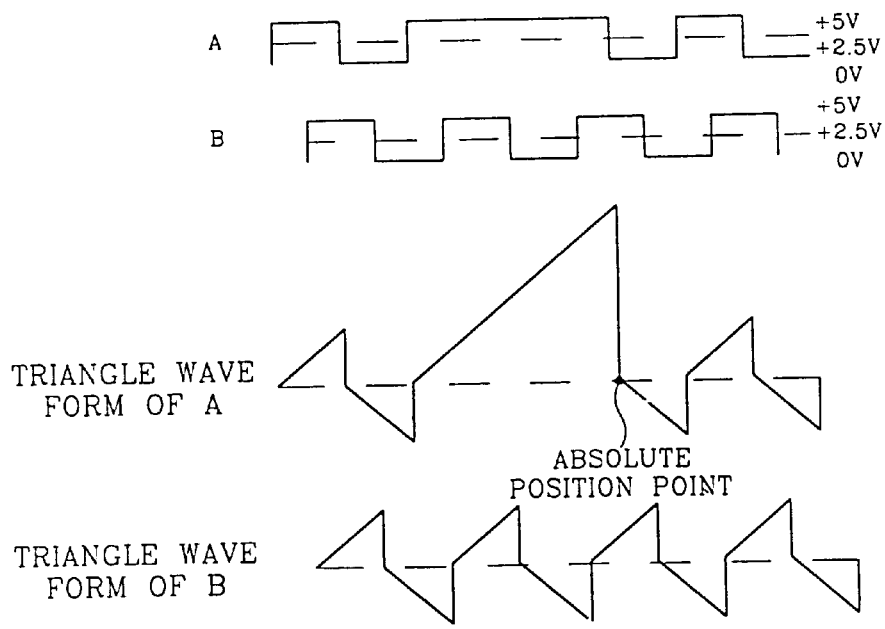
FIG. 16 is a wave form diagrams illustrating a square wave form and triangle wave form converted when a cylinder is moved in the reverse direction during the operation shown in FIG. 14.

FIG. 15 is a wave form diagrams illustrating a square wave form and triangle wave form converted when a cylinder is moved in the normal direction during the operation shown in FIG. 14. FIG. 16 is a wave form diagrams illustrating a square wave form and triangle wave form converted when a cylinder is moved in the reverse direction during the operation shown in FIG. 14. As shown therein, the triangle wave forms are generated in the same principle as the above-described embodiments of FIGS. 10 and 11.

After the square wave forms and triangle wave forms are generated by the second microprocessor 270 (S300), the phases of the thusly generated square wave forms are compared, so that it is possible to determine the moving direction of the cylinder rod (S421). As shown in FIG. 15, if the phase B is ahead of the other phases, the cylinder rod is moved in the normal direction. If the phase A is ahead of the other phases, the cylinder rod is moved in the reverse direction.

In addition, it is determined whether the absolute position points are series two based on the recessed portions of the magnetic scales, using the triangle wave forms generated by the second microcomputer 270 (S423). In the absolute position point, the peak value is compared with the peak value of the normally protruded portion using the peak value of the triangle wave forms. Namely, in the present invention, a predetermined times of three times is used as shown in FIGS. 15 and 16.

In the present invention using the cylinder as shown in FIG. 5, a plurality of the absolute position points exist in accordance with the moving direction of the cylinder rod. The first absolute position values corresponding to each absolute position point are stored in the memory apparatus 250.

In FIG. 5B, the numbers in the circles denote the absolute position point when the piston rod is moved in the normal direction, and the numerals in the squares denote the absolute position points when the piston rod is moved in the reverse direction.

As a result of the judgement, if the absolute position points are series two, the number of square wave forms between two absolute position points is counted (S425), and the thusly counted value and the stored position value corresponding to the moving direction of the cylinder rod are substituted with the first absolute position value (S427).

Thereafter, the second microprocessor 270 recover (S429a) the triangle wave forms, which are generated in the step S320, using the identical wave forms corresponding to the protruded and recessed interval, such that the triangle wave forms have a normal peak value at the absolute position point. These normal peak values are used in order to count the magnetic variation using the 1/N-dividing counter 260. The step S429 is performed for recovering the square wave forms. The above-described operation is shown in FIG. 12.

Figure 17:
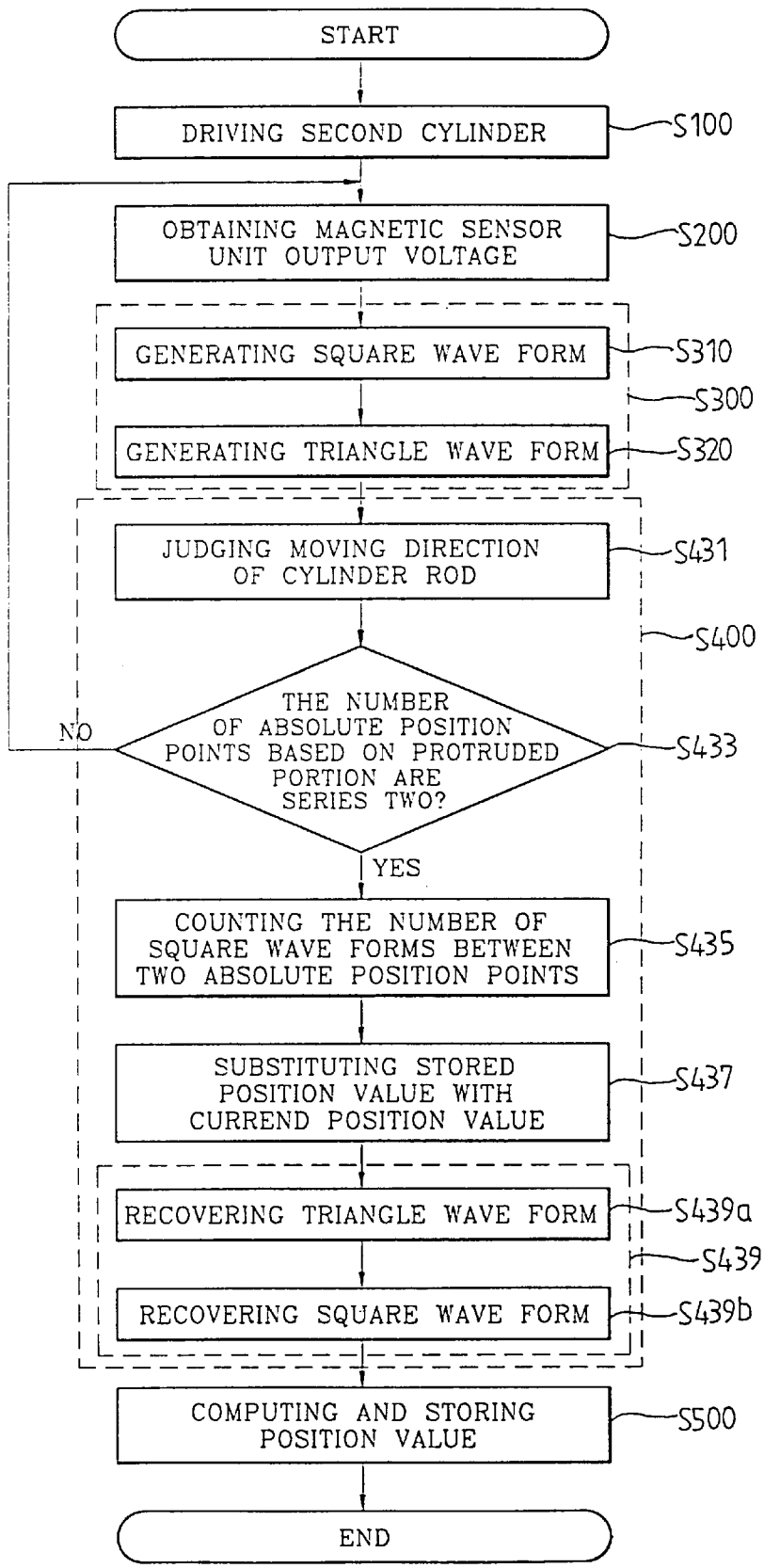
FIG. 17 is a flow chart illustrating an absolute position detection method for a stroke sensing cylinder according to the present invention when the cylinder shown in FIG. 6 is adapted.

FIG. 17 is a flow chart illustrating an absolute position detection method for a stroke sensing cylinder according to the present invention when the cylinder shown in FIG. 6 is adapted.

As shown therein, the absolute position detection method for a stroke sensing cylinder according to the present invention is directed to a protruded portion in the magnetic scale at a predetermined formation interval. The first absolute position value detection and stroke judging step S400 includes a first step S431 for comparing a pair of square wave forms generated in the wave form generation step S300 and determining the stroke direction of the cylinder. A second step S433 is also provided for comparing the phases of a pair of triangle wave forms generated in the wave form generation step S300 and determining whether the absolute position point based on the protruded portion formation of the formation period are series two. A third step S435 is then provided for counting the number of square wave forms between two absolute position points when the absolute position points are series two. A fourth step S437 is also provided for substituting the stored position value with the first absolute position value. The first absolute position value is stored in the memory apparatus as the value corresponding to the direction determined in the first step S431 and the number of square wave forms counted in the third step S435. Lastly, a fifth step S439 is provided for recovering (S439a) the triangle wave forms generated in the wave form generation step S300 after the fourth step S437 to the normal wave forms (S439b) and recovering to the square wave forms having the identical periods.

The absolute position detection method for a stroke sensing cylinder according to the present invention is implemented identically with the embodiment of FIG. 14 except the protrudely and regularly formed magnetic scales.

Figure 18:
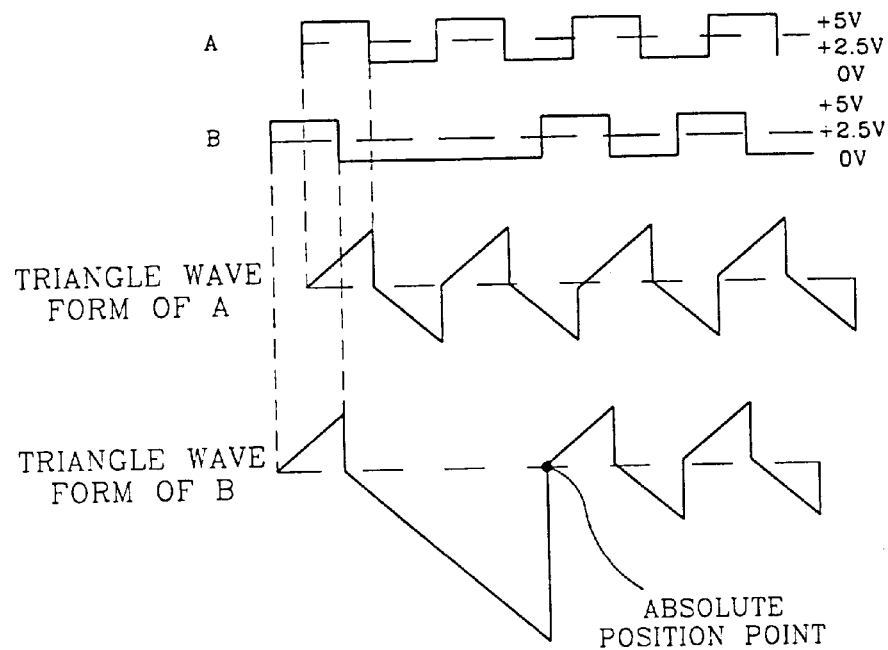
FIG. 18 is a wave form diagrams illustrating a square wave form and triangle wave form converted when a cylinder is moved in the normal direction during the operation shown in FIG. 17.
Figure 19:
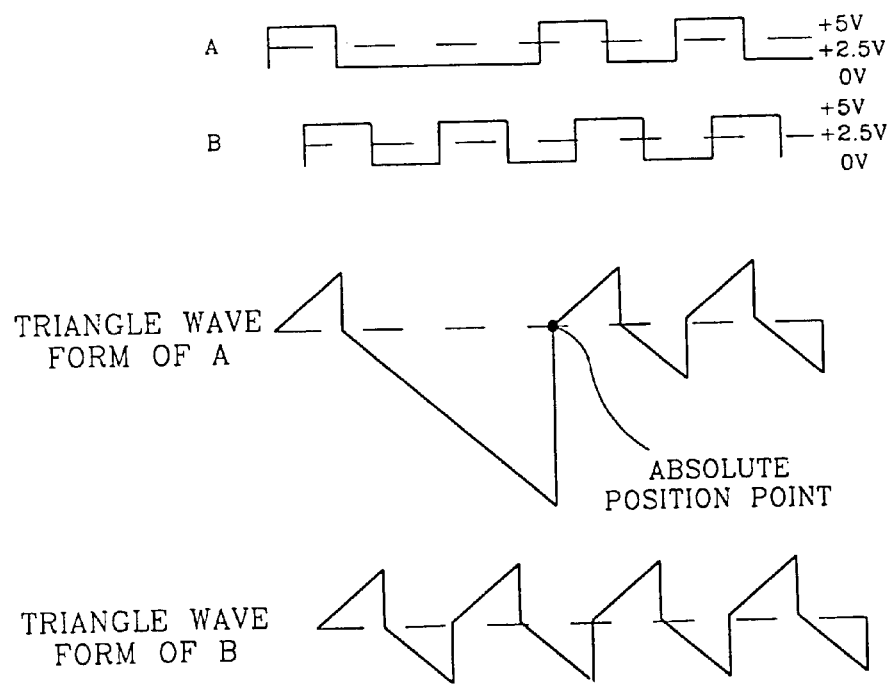
FIG. 19 is a wave form diagrams illustrating a square wave form and triangle wave form converted when a cylinder is moved in the reverse direction during the operation shown in FIG. 17.

FIG. 18 is a wave form diagrams illustrating a square wave form and triangle wave form converted when a cylinder is moved in the normal direction during the operation shown in FIG. 17. FIG. 19 is a wave form diagrams illustrating a square wave form and triangle wave form converted when a cylinder is moved in the reverse direction during the operation shown in FIG. 17. The operations thereof are the same as the embodiment of FIGS. 15 and 16.

In the triangle wave forms generated by the above-described principle, the size of the peak value are three times larger rather than the peak value of the normal triangle wave forms at the protruded portions.

The second microprocessor 270 generates the square wave forms and triangle wave forms (S300) and compares the phases of the square wave forms, thus determining the moving direction of the cylinder rod (S431). As shown in FIG. 18, if the phase B is ahead of the other phases, the cylinder rod is moved in the normal direction. As shown in FIG. 19, if the phase A is ahead of the other phases, the cylinder rod is moved in the reverse direction.

In addition, it is determined whether the absolute position points based on the protruded portions are series two by using the triangle wave forms generated by the second microprocessor 270 (S433), and in the absolute position points, the size of the peak value is compared with the peak value of the normally protruded portion using the peak value of the triangle wave forms. As a result of the comparison, the size difference is −3 times and is shown in FIGS. 18 and 19.

In the present invention, a plurality of the absolute position points exist in accordance with the moving direction of the cylinder rod, and the first absolute position values corresponding to the absolute position points are stored in the memory apparatus 250.

In FIG. 6b, the numbers in the circles denote the absolute position points when the piston rod is moved in the normal direction, and the numbers in the squares denote the absolute position points when the cylinder rod is moved in the reverse direction.

As a result of the judgement, if the number of the absolute position points are series two, the number of square wave forms between two absolute position points are counted in Step S435. The thusly counted value and the stored position value corresponding to the moving direction of the cylinder rod are substituted with the first absolute position value in Step S437.

Thereafter, the second microprocessor 270 recover (S439a) the triangle wave forms, which are generated in the step S320, using the identical wave forms corresponding to the protruded and recessed intervals such that the triangle wave forms have the normal peak values at the absolute position point. These normal peak values are used in order to count the magnetic variation using the 1/N-dividing counter 260. The step S439b is performed for recovering the square wave form. The above-described operation is shown in FIG. 20.

Figure 20:
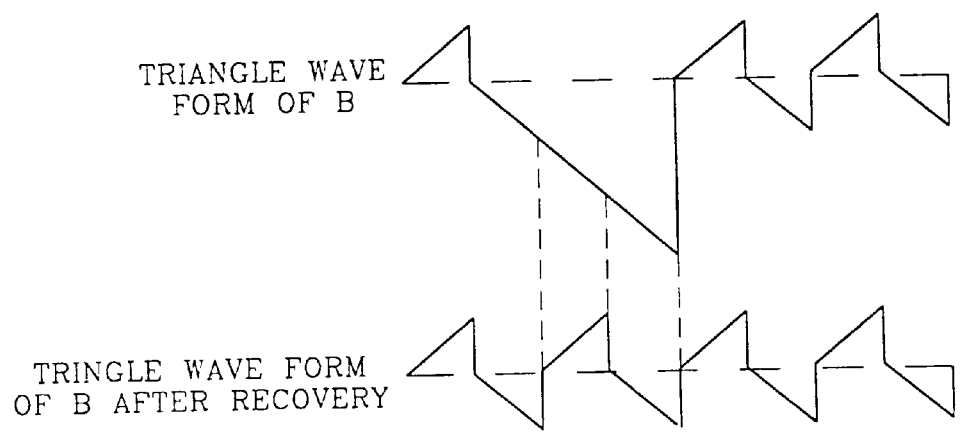
FIG. 20 is a wave form diagrams illustrating a recovery of a square wave form and triangle wave form during the operation shown in FIG. 17.

FIG. 20 is wave form diagrams illustrating a recovery of a square wave form and triangle wave form during the operation shown in FIG. 17.

The triangle wave forms generated by the step S320 are recovered (S439a) to the triangle wave forms corresponding to the originally and regularly protruded and recessed intervals in order to count the variation of the final cylinder rod. The square wave forms of the identical period are recovered from the recovered triangle wave forms and then are inputted into the 1/N-dividing counter 260.

In the recovering operation of the triangle wave forms, the peak values of the triangle wave forms are determined as a multiple of a predetermined integer rather than in terms of the peak values of the normal triangle wave forms. For example, the peak value is increased to 0 in order to generate triangle wave forms between −1.1 times and −2 times, and the same is decreased to 0 between −2.1 times and −3 times, thus recovering the triangle wave forms.

The second absolute position value, which is the absolute amount the cylinder rod is moved, is computed in Step S500.

As described above, in the absolute position detection method for a stroke sensing cylinder according to the present invention, it is possible to implement a stroke sensing cylinder which is capable of reducing any effects due to the external impacts and errors. The cylinder according to the present invention may be used for automation of the construction equipment in an inferior working environment. The absolute position detection method for a stroke sensing cylinder according to the present invention may be used for a hydraulic and/or pneumatic simulation such as an automation system using the hydraulic and pneumatic apparatus.

Although the preferred embodiments of the present invention have been disclosed for illustrative purposes, those skilled in the art will appreciate that various modification, additions and substitutions are possible, without departing from the scope and spirit of the invention as recited in the accompanying claims.

What is claimed is:

1. In a method for detecting a magnetic flux change of a magnetic scale using a plurality of magnetic sensors with respect to the cylinder rod including at least one different magnetic scale processing period in a regularly protruded and recessed portion, signal-processing using a microcomputer and a 1/N-dividing counter, counting the thusly signal-processed wave forms, and judging an absolute position and direction with respect to a stroke of a cylinder, the improved method comprising the steps of:

a magnetic scale detecting step for detecting a plurality of sine wave form voltages having different phases using a magnetic sensor unit in accordance with a driving operation of the cylinder;

a wave form generation step for converting said plurality of sine wave form voltages obtained in said magnetic scale detection step into a plurality of corresponding square wave forms, said wave form generation step further generating a plurality of triangle wave forms, each of said plurality of triangle wave forms having the same period as a corresponding one of said plurality of square wave forms;

a first absolute position value detection and stroke direction judging step for judging a first absolute position value and stroke direction of the cylinder using a pair of said plurality of square and triangle wave forms generated in said wave form generation step; and a second absolute position value computation and storing step for computing and storing a second absolute position value having a predetermined value based on the first absolute position value.

2. The absolute position detection method for a stroke sensing cylinder of claim 1, wherein said first absolute position value detection and stroke direction judgement step includes:

a first step for comparing a pair of triangle wave form phases generated in the wave formation generation step and recognizing an absolute position point;

a second step for substituting a position value stored in the memory apparatus with a first absolute position value with respect to the current position when there is an absolute position point as a result of the judgement in the first step;

a third step for recovering a triangle eave form generated in the wave form generation step after the second step to a normal wave form which is identical with the period of the regularly protruded and recessed period and recovering a square wave form of the identical period based on the recovered triangle wave form; and a fourth step for comparing the phase of a square wave form recovered in the third step and judging a direction with respect to the stroke of the cylinder.

3. The absolute position detection method for a stroke sensing cylinder of claim 2, wherein said first step is directed to comparing a peak value of one phase of the triangle wave form with a peak value of one period and recognizing as an absolute position point when the peak value is a predetermined integer time and the peak value of another phase is 0.

4. The absolute position detection method for a stroke sensing cylinder of claim 2, wherein said third step is directed to decreasing the peak value from 0 when the peak value of the triangle wave form corresponding to a normal magnetic scale generated by another magnetic scale having different period in the wave form generations is 1.1 times to 2 times and recovering the triangle wave form by decreasing the peak value from 0 between 2.1 times and 3 times.

5. The absolute position detection method for a stroke sensing cylinder of claim 1, wherein said second absolute position value computation and storing step is directed to summing a coarse distance value which is computed by 1/N-dividing and counting the square wave forms recovered in claim 2 and a fine distance value computed by the current triangle wave form value by the peak value of the triangle wave form before one period, thus computing a second absolute position value.

6. The absolute position detection method for a stroke sensing cylinder of claim 1, wherein said first absolute position value detection and stroke direction judgement step includes:

a first step for comparing a pair of square wave form phases generated by the wave form generation step and judging a direction with respect to the stroke of the cylinder;

a second step for comparing a pair of triangle wave forms generated in the wave form generation step and judging whether the number of absolute position points based on the recessed portion formation of the deformed period is series two;

a third step for computing the number of square wave forms between two absolute position points when the number of the absolute position points are series two as a result of the judgement in the second step;

a fourth step for substituting the position value stored in the memory apparatus with a first absolute position value with respect to the current position based on a value corresponding to the number of direction and square wave forms with respect o the stroke of the cylinder judged in the first and third steps; and a fifth step for recovering the triangle wave form generated in the wave form generation step to a normal wave form identical to the period of the regularly protruded interval and recovering a square wave form of the identical period based on the thusly recovered triangle wave form.

7. The absolute position detection method for a stroke sensing cylinder of claim 6, wherein said absolute position judgement of the second step is directed to comparing the peak value of the triangle wave form generated in the wave form generation step with a peak value of the normally protruded portion and recognizing a predetermined integer time as an absolute position point.

8. The absolute position detection method for a stroke sensing cylinder of claim 7, wherein in said absolute position point, the peak value of the triangle wave form generated in the wave form generation step is three times the peak value corresponding to a normally protruded and recessed portion.

9. The absolute position detection method for a stroke sensing cylinder of claim 6, wherein in said fifth step, the peak value is decreased from 0 so as to form a triangle wave form wherein the peak value of the triangle wave form corresponding to a recessed portion in which a magnetic scale is not formed at a predetermined formation period is between 1.1 times and 2 times compared to the peak value of the triangle wave form corresponding to a normal magnetic scale, and the same is decreased from 0 between 2.1 times and 3 times.

10. The absolute position detection method for a stroke sensing cylinder of claim 1, wherein said first absolute position value detection and stroke direction judgement step includes:

a first step for comparing a pair of square wave form phases generated in the wave form generation step and judging a direction with respect to a stroke of the cylinder;

a second step for comparing a pair of triangle wave form phases generated in the wave form generation step and judging whether the number of absolute position points based on the protruded portions of the deformation period is series two;

a third step for counting the number of square wave forms between two absolute position points when the number of absolute position points is series two as a result of the judgment of the second step;

a fourth step for substituting a position value stored in the memory apparatus with a first absolute position value using a value corresponding to the number of direction and square wave forms with respect to the stroke of the cylinder judged in the first and third steps; and a fifth step for recovering a triangle wave form generated in the wave form generation step after the fourth step to a normal wave form which is identical to the period of the originally and protrudely protruded and recessed portions and recovering to the square wave form of the identical period based on the thusly recovered triangle wave form.

11. The absolute position detection method for a stroke sensing cylinder of claim 10, wherein said absolute position point judgement in the second step is directed to comparing the peak value of the triangle wave form generated in the wave form generation step with the peak value of a normally protruded and recessed portion and recognizing the point where the peak value is (−) times as an absolute position point.

12. The absolute position detection method for a stroke sensing cylinder of claim 11, wherein in said absolute position point, the peak value of the triangle wave form generated in the wave form generation step is −3 times the peak value corresponding to a normally protruded and recessed portion.

13. The absolute position detection method for a stroke sensing cylinder of claim 10, wherein in said fifth step, the peak value is decreased from 0 so as to form a triangle wave form wherein the peak value of the triangle wave form corresponding to a protruded portion in which a magnetic scale is not formed at a predetermined formation period is between −1.1 times and −2 times compared to the peak value of the triangle wave form corresponding to a normal magnetic scale, and the same is decreased from 0 between −2.1 times and −3 times.

* * * * *